United States Patent [19]
Cauley et al.

[11] 3,997,871
[45] Dec. 14, 1976

[54] VERIFICATION SYSTEM

[75] Inventors: Ronald R. Cauley, Libertyville; William G. Hoskins, Lake Forest, both of Ill.

[73] Assignee: 1st National Bank of Libertyville, Libertyville, Ill.

[22] Filed: Oct. 24, 1975

[21] Appl. No.: 625,680

[52] U.S. Cl. .......................... 340/147 MD; 317/134; 340/274 C

[51] Int. Cl.² .......................... H04Q 3/02; H01H 27/00

[58] Field of Search ... 340/149 R, 149 A, 147 MD, 340/274 C, 63, 164 R; 317/134

[56] References Cited

UNITED STATES PATENTS

| | | | |
|---|---|---|---|
| 3,100,389 | 8/1963 | Noregaard | 317/134 X |
| 3,234,516 | 2/1966 | Miller | 340/164 |

*Primary Examiner*—Donald J. Yusko
*Attorney, Agent, or Firm*—Richard O. Gray, Jr.

[57] ABSTRACT

The disclosure relates to a verification system of the type which affords authorized persons access to check cashing facilities, private buildings, or the like. The verification system comprises a plurality of sets of switches, each set including a plurality of switches comprising a first group of switches and a second group of switches, coupling means coupling the first group of switches for each but one set of switches to all of the switches of the next succeeding set for serially coupling the sets of switches, indicating means coupled to the first group of switches of the one set and disabling means coupled to the second group of switches of each set for disabling the system responsive to any one of the second group of switches. As a result, when one of the first group of switches of each set is closed, the indicating means provides a verification indication and when any one of the second group of switches is closed, the disabling means disables the system indicating non-verification.

6 Claims, 2 Drawing Figures

VERIFICATION SYSTEM

BACKGROUND OF THE INVENTION

The present invention is directed to a verification system and in particular to a verification system of the type which gives authorized persons access to check cashing facilities or the like.

There are many instances in which, for security reasonsm it is desirable to limit access of certain facilities to authorized persons only. Such would be the case in giving access to check cashing facilities, entrance to private clubs or apartment buildings, or the like. In retail store outlets for example, it is often convenient to provide customers with check cashing facilities to encourage business and to accomodate the convenience of customers. Obviously, such facilities require a verification system for limiting access of the facilities to approved and authorized persons. Such a system must be quick and easy to use and afford a reasonable degree of security.

It is therefore an object of the present invention to provide a new and improved verification system.

It is a still further object of the present invention to provide a verification system which is easy and convenient to use.

It is a further object of the present invention to provide a verification system which affords a reasonable degree of security.

SUMMARY OF THE INVENTION

The invention provides a verification system comprising a plurality of sets of switches, each set including a plurality of switches comprising a first group of switches and a second group of switches, coupling means coupling the first group of switches of each but one set of switches to all of the switches of the next succeeding set for serially coupling the sets of switches, indicating means coupled to the first group of switches of the one set, and disabling means coupled to the second group of switches of each set for disabling the system responsive to any one of the second group of switches. As a result, when one of the first group of switches of each set is closed, the indicating means provides a verification indication, and when any one of the second group of switches is closed, a disabling means disables the system indicating non-verification.

DESCRIPTION OF THE DRAWINGS

The features of the present invention which are believed to be novel are set forth with particularity in the appended claim. The invention, together with further objects and advantages thereof, may best be understood by reference to the following description in conjunction with the accompanying drawings, and in the several FIGS. in which like reference numerals indicate identical elements and in which:

DESCRIPTION OF THE PREFERRED EMBODIMENT

Figure 1:
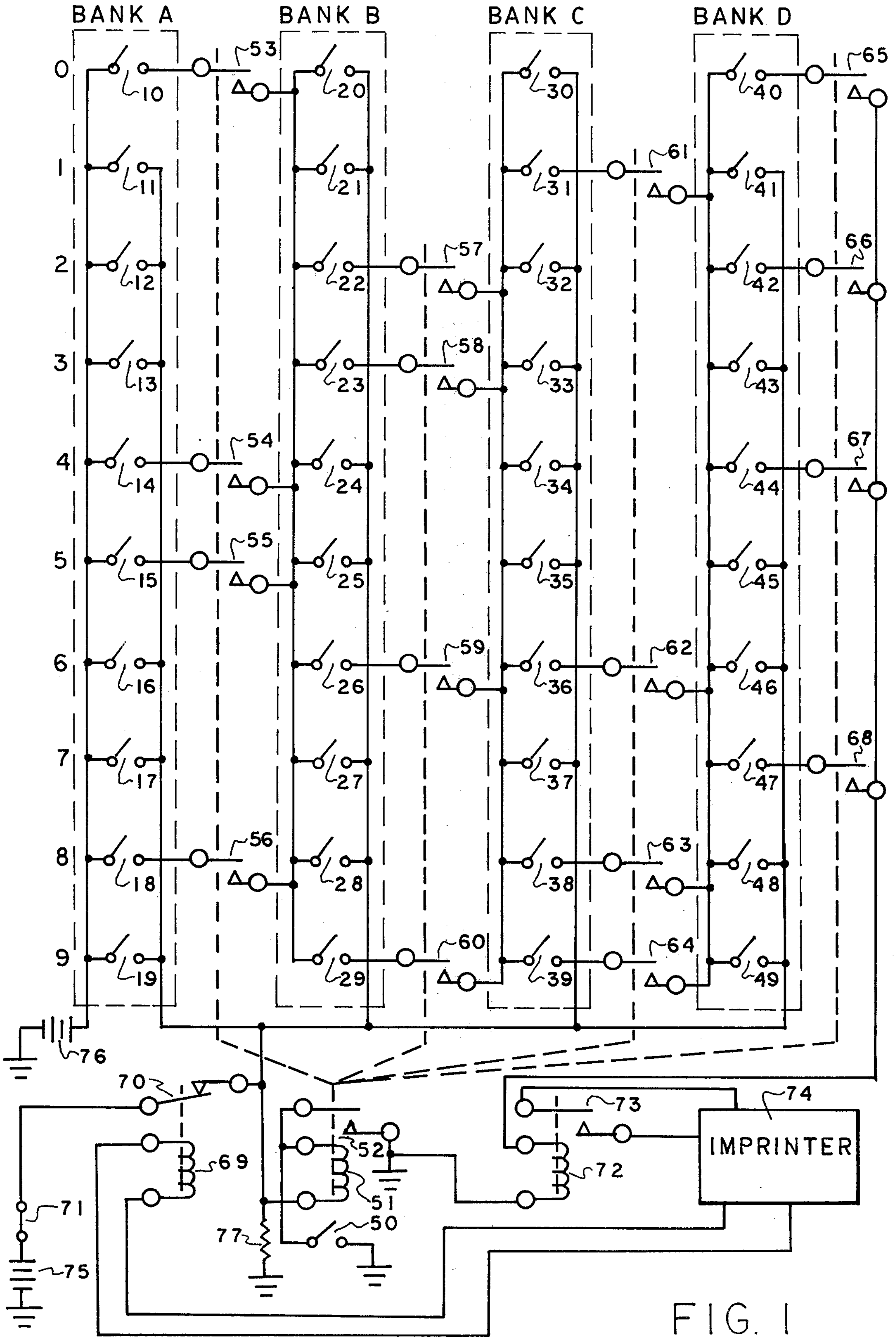
FIG. 1 is a schematic circuit diagram of a verification system embodying the present invention.

Referring now to FIG. 1, the verification system thereshown comprises a plurality of banks or sets of switches including bank A, bank B, bank C, and bank D, start switch 50, start relay 51 which has relay switch contacts 52 through 68, release realy 69 having switch contact 70, release switch 71, operate relay 72 having switch contact 73, imprinter 74, and batteries 75 and 76.

Switch bank A comprises switches 10 through 19, switch bank B comprises switches 20 through 29, switch bank C comprises switches 30 through 39, and switch bank D comprises switches 40 through 49. As can be seen in the drawing of FIG. 1 the switches are arranged in rows with each bank representing one digit of a four digit number and each switch within each bank representing a different decimal value for its respective digit. All of the switches of each bank are connected together on one side with switches 10 through 19 of bank A coupled to battery 76 which is in turn coupled to ground. Also, each bank of switches is divided into first and second groups, the first group of switches being valid switches and the second group being invalid switches. Switches 10, 14, 15 and 18 comprise the first group of switches of bank A and switches 11, 12, 13, 16, 17 and 19 comprise the second group of switches of bank A. Switches 22, 23, 26 and 29 comprise the first group of switches of bank B and switches 20, 21, 24, 25, 27 and 28 comprise the second group of switches of bank B. Switches 31, 36, 38 and 39 comprise the first group of switches of bank C and switches 30, 32, 33, 34, 35 and 37 comprise the second group of switches of bank C. Lastly, switches 40, 42, 44 and 47 comprise the first group of switches of bank D and switches 41, 43, 45, 46, 48 and 49 comprise the second group of switches of bank D.

Start relay contacts 53 through 64 comprise a coupling means for coupling the first group of switches of bank A, B and C to all of the switches of the next succeeding set for serially coupling the sets of switches. The coupling means also comprises start relay contacts 65 through 68 which couple the first group of switches of bank D to the operate relay 72.

Imprinter 74 coupled to the operate relay 72 at contact 73 comprises an indicating means which imprints a stamp on a check to indicate a verification. Imprinter 74 is also coupled to release relay 69 for resetting the system upon verification.

Start switch 50 activats the system and to that end is coupled at one side to ground and at the other side to start relay coil 51. Start relay coil 51 is in turn coupled to release relay contact 70 which is coupled to release switch 71. Release switch 71 is coupled to battery 75. For deactivating or disabling the system, all of the switches comprising the second group of switches of each switch bank are coupled to start relay coil 51 at resistor 77 of disabling the system when any one of the second group of switches is closed.

In operation, the verification system of FIG. 1 will provide an imprinted verification indication for any combination of the followng:

| BANK A | BANK B | BANK C | BANK D |
|---|---|---|---|
| 0 | 2 | 1 | 0 |
| 4 | 3 | 6 | 2 |
| 5 | 6 | 8 | 4 |
| 8 | 9 | 9 | 7 |

In use, each customer who is authorized to utilize the check cashing facilities will be given a four digit number which satisfied the above combination. In using the system, a customer having an assigned four digit number will first place his check to be cashed into the imprinter. To activate the verification system, the customer first closes start switch 50 which completes a circuit from battery 75 to ground through release switch 71, start relay contact 70, start relay 51, and start switch 50. This energizes start relay 51 and closes contact 52. Simultaneously, switch contacts 53 through 68 of relay 51 will close. Now, the customer closes the appropriate switches of banks A, B, C and D corresponding to the four digit number which has been assigned to him. For example, if the customer had been assigned number 4684 he will first close switch 14 of bank A, then switch 26 of bank B, then switch 38 of bank C, and switch 44 of bank D. In doing so, the customer transfers the voltage of battery 76 tρ the operate relay 72 through switch 14 coupling switch 54, switch 26, coupling switch 59, switch 38, coupling switch 63, switch 44, and coupling switch 67. The battery voltage generated at the operate relay 72 energizes the operate relay and closes contact 73 to energize imprinter 74. Imprinter 74 will then imprint a verification indication stamp on the check so that the customer may cash his check.

Upon the verification, release relay 69 which is coupled to the imprinter will in response to the imprinter open contact 70 to open the circuit from battery 75 to start relay 51. This will then cause relay contact 52 to open and all of the coupling switches 53 through 68 to open to deactivate the system. Also in doing so, the system is reset for the next customer.

Thus, when one of the first group of switches of each bank is closed, a circuit will be completed from battery 76 to the operate relay 72 and imprinter 74 for providing a verification indication. However, should any one of the second group of switches be closed (corresponding to an unauthorized four digit number) the verification system of FIG. 1 has means for disabling the system to prohibit unauthorized use of the check cashing facilities. Specifically, assume that the customer instead of closing switch 26 of bank B closed switch 25 of bank B. A circuit will be completed from battery 76 to resistor 77 to impress upon start relay 51 a de-energizing current to cause start relay contact 52 to open and thus open all of the coupling switches 53 through 68. In this manner, unauthorized use of the facilities is prohibited.

Because there are only four valie switches in each of the four banks A, B, C and D, and because there are ten switches in each bank, there are only 256 valid four digit combinations out of 10,000 possible combinations. Thus, while the verification system of FIG. 1 is relatively uncomplex, it affords a reasonable degree of security.

If while using the system a customer realizes that he closed an incorrect switch, he may reset the system and try again by opening release switch 71. This will cause start relay contact 52 to open along with all of the coupling switches. The system may then be reactivated in the previously described manner.

Figure 2:
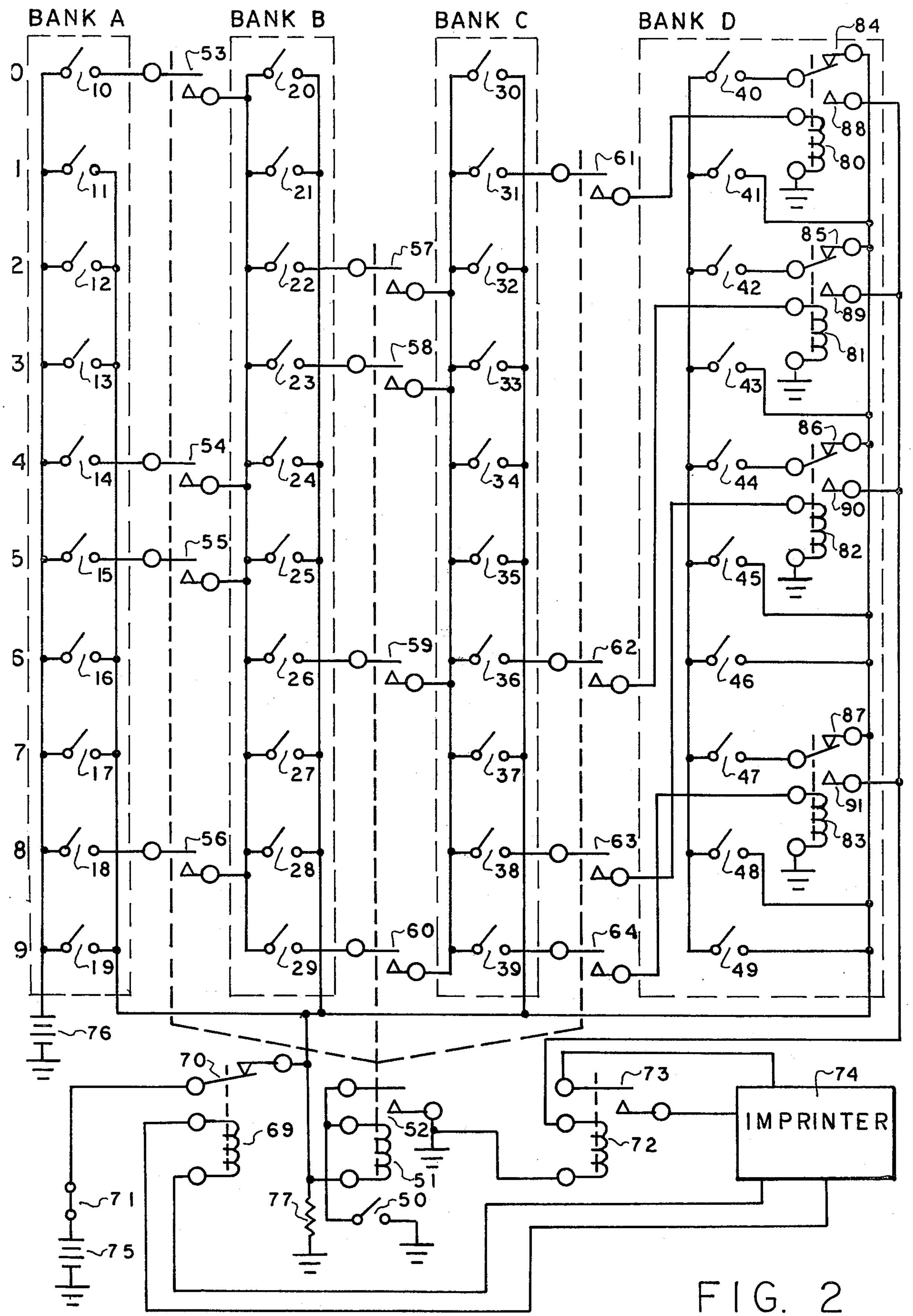
FIG. 2 is a circuit diagram of another embodiment of the verification system of the present invention.

Referring now to FIG. 2, the verification system thereshown is another embodiment of the present invention. It is essentially identical to the verification system of FIG. 1 except that switch banks C and D have been combined in order to reduce the number of possible verification combinations. As can be seen in FIG. 2, switches 31, 36, 38 and 39 which comprise the first group of switches of bank C are associated with relays 80, 81, 82 and 83 respectively. Each of the relays 80 through 83 has a normally closed contact 84, 85, 86 and 87 respectively and a normally open contact 88, 89, 90 and 91 respectively. As a result, the verification system of FIG. 2 will provide a verification indication on any combination as follows:

| BANK A | BANK B | BANKS C & D |
|---|---|---|
| 0 | 2 | 10 |
| 4 | 3 | 62 |
| 5 | 6 | 84 |
| 8 | 9 | 97 |

As a result of the above referred to modification in FIG. 2, it is absolutely essential that a customer in order to obtain verification to close switch 31 only in combination with switch 40, switch 36 only in combination with switch 42, switch 38 only in combination with switch 44, or switch 39 only in combination with switch 47. All other combinations of bank C and D will result in a non-verification indication through the disabling of the system.

To further explain the operation of the verification system of FIG. 2, assume that a customer has been assigned the fur digit number of 0210. The customer will first close start switch 50 which as in the embodiment of FIG. 1 will cause all of the coupling switches to close. Then the customer closes switch 10, and switch 20 which causes the battery voltage of battery 76 to appear at the common junction of all of switches 30 through 39 of bank C. The customer then closes switch 31 which causes relay 80 to change its state such that normally open contact 88 closes and normally closed contact 84 opens. Then, the customer must close switch 40 to complete the circuit from battery 76 to the operate relay 72 and the imprinter 74. Having that accomplished, the customer will receive an imprinted verification indication on his check.

Assume now that the customer incorrectly impressed one of the switches in banks C or D. Specifically, assume that the customer did close switch 31 but insteand of closing switch 40 he closed switch 42. When the customer closed switch 31 the voltage from battery 76 was transferred to the common junction of all of the switches 40 through 49. When he closed switch 42 that battery voltage was transferred through switch 42, through the normally closed contacts 85 of relay 81, and bank to resistor 77 to disable the system. Thus, with only a slight modification of the verification system of FIG. 1, as depicted in FIG. 2, greater degree of security can be obtained.

While particular embodiments of the invention have been shown and described, modifications may be made, and it is intended in the appended claims to cover all such modifications as may fall within the true spirit and scope of the invention.

What is claimed is:

1. A verification system comprising:

a plurality of sets of switches, each said set including a plurality of switches comprising a first group of switches and a secnd group of switches;

coupling means coupling said first group of switches of each but one set of switches to all of the switches of the next succeeding set for serially coupling said sets of switches;

indicating means coupled to the first group of switches of said one set; and disabling means coupled to said second group of switches of each said set for disabling the system responsive to any one of said second group of switches; whereby, when one of said first group of switches of each said set is closwd, said indicating means provides a verification indication, and when any one of said second groyp of switches is closed, said disabling means disables the system indicating non-verification.

2. A verification system in accordance with claim 1 wherein said coupling means also couples said indicating means to said first group of switches of said one set.

3. A verification system in accordance with claim 2 wherein said coupling means comprises a plurality of coupling switches, each said coupling switch being associated with a given respective one of said first group of switches.

4. A verification system in accordance with claim 3 further comprising a start relay for closing said coupling switches to activate the system.

5. A verification system in accordance with claim 4 wherein said start relay is also coupled to each of said second group of switches to thereby open said coupling switches responsive to said second group of switches for disabling the system.

6. A verification system in accordance with claim 5 further comprising release means coupled between said indicating means and said start relay and responsive to said indicating means to thereby cause said start relay to open said coupling switches and to reset the system following a verification indication.

* * * * *

UNITED STATES PATENT OFFICE
CERTIFICATE OF CORRECTION

PATENT NO. : 3,997,871

DATED : December 14, 1976

INVENTOR(S) : Ronald R. Cauley et al.

It is certified that error appears in the above-identified patent and that said Letters Patent are hereby corrected as shown below:

Column 1, lines 10 and 11, after "reasons" change "m" to a comma

Column 2, line 2, "realy" should be -- relay --

Column 2, line 45, "activats" should be -- activates --

Column 2, line 53, "of" should be -- for --

Column 3, line 1, "satisfied" should be -- satisfies --

Column 3, line 49 "valie" should be -- valid --

Column 4, line 27, "fur" should be -- four --

Column 4, lines 44 and 45, "insteand" should be -- instead --

Column 4, line 65, "secnd" should be -- second --

Column 5, line 8, "closwd" should be -- closed --

Column 5, line 10, "groyp" should be -- group --

Signed and Sealed this

First Day of March 1977

[SEAL]

*Attest:*

RUTH C. MASON
*Attesting Officer*

C. MARSHALL DANN
*Commissioner of Patents and Trademarks*